USO08155504B1

(12) United States Patent
Lin

(10) Patent No.: US 8,155,504 B1
(45) Date of Patent: Apr. 10, 2012

(54) METHOD OF DISASTER RECOVERY FOR RE-WRITABLE DISK MEDIA

(75) Inventor: Shu Lin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 2121 days.

(21) Appl. No.: 10/129,862

(22) PCT Filed: Nov. 7, 2000

(86) PCT No.: PCT/US00/30603
§ 371 (c)(1),
(2), (4) Date: Sep. 16, 2002

(87) PCT Pub. No.: WO01/35406
PCT Pub. Date: May 17, 2001

Related U.S. Application Data

(60) Provisional application No. 60/164,806, filed on Nov. 10, 1999.

(51) Int. Cl.
*H04N 5/94* (2006.01)
(52) U.S. Cl. ....................................... 386/277
(58) Field of Classification Search ............... 369/53.19, 369/53.18, 30.24; 386/95
See application file for complete search history.

(56) References Cited

U.S. PATENT DOCUMENTS

| | | | |
|---|---|---|---|
| 4,598,357 A | 7/1986 | Swenson et al. ............... 364/200 |
| 4,932,014 A * | 6/1990 | Tamiya ....................... 369/47.23 |
| 5,481,694 A | 1/1996 | Chao et al. ................... 395/439 |
| 5,517,632 A * | 5/1996 | Matsumoto et al. .......... 711/114 |
| 5,553,045 A * | 9/1996 | Obata ........................ 369/53.17 |
| 5,555,371 A | 9/1996 | Duyanovich et al. ..... 395/182.11 |
| 5,585,845 A | 12/1996 | Kawamura et al. ........... 348/231 |
| 5,590,101 A * | 12/1996 | Itoi ............................. 369/30.23 |
| 6,170,066 B1 * | 1/2001 | See ................................. 714/22 |
| 6,243,340 B1 * | 6/2001 | Ito et al. ..................... 369/53.19 |
| 6,353,702 B1 * | 3/2002 | Ando et al. ..................... 386/95 |
| 7,000,152 B1 | 2/2006 | Lin |

FOREIGN PATENT DOCUMENTS

EP 0584804 A2 * 3/1994
(Continued)

OTHER PUBLICATIONS

Patent Abstracts of Japan, vol. 016, No. 241, Jun. 3, 1992 & JP 4-052725.
(Continued)

*Primary Examiner* — William C Vaughn, Jr.
*Assistant Examiner* — Tat Chio
(74) *Attorney, Agent, or Firm* — Robert D. Shedd; Robert B. Levy; Jorge Tony Villabon

(57) ABSTRACT

A method for media disaster recovery when recording data to re-writable disk media can include defining a sequence of recordable units (RUs) in the re-writable disk media wherein each RU in the sequence has a maximum data capacity. Data can be sequentially recorded in each RU, in sequence. When data has been completely recorded in an RU, RU metrics can be computed. Subsequently, the computed RU metrics can be stored in an RU information file in the re-writable disk media. Significantly, responsive to a media disaster, for example a power outage, a disaster RU can be identified in the RU information file. Specifically, the disaster RU can be an RU in which data had been incompletely recorded during the media disaster. Upon identifying the disaster RU, the sequential recording of data can resume in an RU next in sequence to the disaster RU.

30 Claims, 7 Drawing Sheets

FOREIGN PATENT DOCUMENTS

| | | |
|---|---|---|
| EP | 0 881 569 | 12/1998 |
| JP | 4-052725 | 2/1992 |
| JP | 8-77709 | 3/1996 |
| JP | 10-326220 | 12/1998 |

OTHER PUBLICATIONS

"A Review of the DVD-RAM Format Specification", Version 1; Oct. 3, 1998.

* cited by examiner

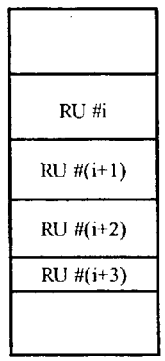
*FIG. 4*
| RU # | START ADDRESS | SIZE | INFOSTADD | INFOSZ | DATE_AND_TIME |
|---|---|---|---|---|---|
| I | xxxxx | xxxxx | xxxxx | xxx | xx.xx.xx.xx.xx.xx |
| I+1 | xxxxx | xxxxx | xxxxx | xxx | xx.xx.xx.xx.xx.xx |
| I+2 | xxxxx | xxxxx | xxxxx | xxx | xx.xx.xx.xx.xx.xx |
| I+3 | xxxxx | xxxxx | xxxxx | xxx | xx.xx.xx.xx.xx.xx |
*FIG. 5*
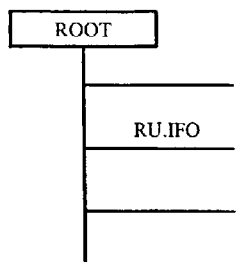
*FIG. 6*
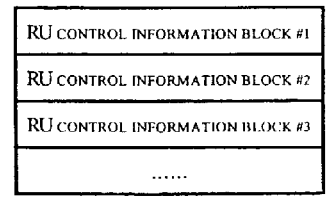
*FIG. 7*

METHOD OF DISASTER RECOVERY FOR RE-WRITABLE DISK MEDIA

This application claims the benefit under 35 U.S.C. §365 of International Application PCT/US00/30603, filed Nov. 7, 2000, which was published in accordance with PCT Article 21(2) on May 17, 2001 in English; and which claims benefit of U.S. provisional application Ser. No. 60/164,806 filed Nov. 10, 1999.

BACKGROUND OF THE INVENTION

1. Technical Field

The inventive arrangements relate generally to a method and apparatus for providing advanced operating features for audio only, video only and both video and audio programs recorded on recordable and re-writable disk media, for example recordable digital video disks, hard drives and magneto optical disks, and more particularly to a method and apparatus for disaster recovery for re-writable disk media.

2. Description of the Related Art

Various devices have been developed to enable consumers to record video and/or audio programs for later presentation. Such devices include tape recorders, video cassette recorders, recordable compact disks, and most recently, recordable digital video disks (DVD). Hard drives and magneto optical disks have also been used. A DVD in which data can be recorded once only, and thereafter is essentially a DVD read only memory, is referred to by the acronym DVD-R. The acronym DVD-R also has been used generally to refer to write-once, or record-once, technology. In contrast to DVD-R, several formats exist in which data can be recorded to a DVD, erased and re-recorded. In sum, such a DVD can be overwritten or rewritten. These DVDs typically are referred to by the acronyms DVD-RAM, DVD-RW and DVD+RW. Although, as of this time no uniform industry standard has been adopted, the acronyms DVD-RAM, DVD-RW and DVD+RW have been used generally to refer to the respective rewritable technologies. Still, reference herein to re-writable DVD technology, devices and methods is generally intended to encompass all of the standards which are now being used, as well as those which may be developed in the future.

Present DVDs can have a logical file structure in which audio-video content can be stored. Specifically, as shown in FIG. 9, at the top of the file structure hierarchy of a DVD 900, one or more titles 901 can exist which can loosely correlate to program episode titles. Titles 901 can consist of control data 902 in addition to one or more Video Object Sets 903 (VOBS). The control data 902 can contain information for managing the title 901. Each VOBS 903 can include a plurality of Video Objects (VOB) 904. Each VOB 904 preferably includes a plurality of Cells 905. Each Cell 905 preferably includes a plurality of Video Object Units (VOBU) 906. Each VOBU 906 roughly correlates to a group of pictures which is the smallest addressable chunk in the DVD 900.

Notably, each VOBU 906 can contain an integer number of video frames. As such, each VOBU 906 can contain 0.4 to 1.0 seconds of presentation material. A typical VOBU 906 in a commercial motion picture can contain 0.5 second of presentation material. Notably, each VOBU 906 can include a sequence of packs 907 positioned in recording order. Preferably, each VOBU can begin with a navigation pack 908 (NV_PCK or NAV_PACK) which can be followed by audio-visual data packs 909, for example video packs (V_PCK), audio packs (A_PCK) and sub-picture packs (SP_PCK). The NV-PCK 908 can contain navigation information, which can be useful in implementing trick modes of operation. The NV_PCK 908 also can include presentation control information (PCI) and data search information (DSI).

Notably, all disk media and devices for recording and playing back program data are subject to data disasters. Data disasters are generally thought of as being characterized by the total or partial loss of data on the disk as the data is written onto the disk, read from the disk, or both. In particular, data disasters can result, for example, from the unexpected loss of power during recording or an accidental ejection of a disk. Data disasters also can be caused by the locking-up or unintentional non-responsive state of the media recorder. When a media recorder enters a non-responsive state, typically the sole recovery method is an intentional interruption of power in order to reset the media recording device.

Data disasters can cause the loss of all information in the memory of a disk media recorder. For example, if during the recording of a sporting event, the recording device loses power, all data residing in memory, including control information, will have been lost. Still, if the recording device subsequently regains power, the user may want to resume recording the event. Resuming recording, however, can prove problematic inasmuch as loss of control information can risk the overwriting of previously recorded data with newly recorded data. Hence, there exists a need for developing new methods for recovering from data disasters when recording data to re-writable disk media.

SUMMARY OF THE INVENTION

A method for media disaster recovery when recording data to re-writable disk media can include the steps of: defining a sequence of recordable units (RUs) in the re-writable disk media wherein each RU in the sequence has a maximum data capacity. Data can be sequentially recorded in each RU, in sequence. When data has been completely recorded in an RU, RU metrics can be computed. Subsequently, the computed RU metrics can be stored in an RU information file in the re-writable disk media. Preferably, the RUs are physically adjacent to one another. However, in an alternative embodiment, the RUs can be merely logically adjacent to one another. Accordingly, in the case where the RUs are logically adjacent to one another, the RU metrics for each RU can include a start address for a logically adjacent RU next in sequence to the RU.

In one embodiment of the present invention, the RU has a fixed size. Preferably, the fixed size does not exceed the maximum data capacity of the RU. In an alternative embodiment, each RU has a variable size. Similar to the case in which the RU has a fixed size, in the case where the RU has a variable size, the variable size does not exceed the maximum data capacity of the RU.

Significantly, responsive to a media disaster, for example a power outage, a disaster RU can be identified in the RU information file. Specifically, the disaster RU can be an RU in which data had been incompletely recorded during the media disaster. Upon identifying the disaster RU, the sequential recording of data can resume in an RU next in sequence to the disaster RU. The step of identifying the disaster RU can include ascertaining by the metrics in the RU information file an RU in which data had been most recently completely recorded; and, determining the disaster RU to be an RU next in sequence to the ascertained RU.

The method of the invention can further include the step of determining control information for data stored in each RU in the sequence and storing the computed control information in RU control information blocks. Notably, the control information can include video object unit addresses, a current address, and a recording start address. The RU control information blocks preferably are stored in the re-writable disk media separately from corresponding RUs. As such, the method of the invention also can include re-scanning data stored in the disaster RU; computing control information for the re-scanned data; and, storing the computed control information for the re-scanned data in an RU control information block.

In the preferred embodiment, the RU metrics for each RU can include a start address for the RU, an indication of size for the RU, and a data/time stamp indicating when data had been completely recorded in the RU. Alternatively, in the case where control information has been computed and stored in control information blocks, the RU metrics can include for each RU a start address for the RU, an indication of size for the RU, a start address for a corresponding RU control information block, an indication of size of the corresponding control information block, and a data/time stamp indicating when data had been completely recorded in the RU.

BRIEF DESCRIPTION OF THE DRAWINGS

FIGS. 4-7 are useful for explaining an efficient disaster recovery method in accordance with the inventive arrangements.

DETAILED DESCRIPTION OF THE PREFERRED EMBODIMENTS

Recordable DVD Device

Figure 1:
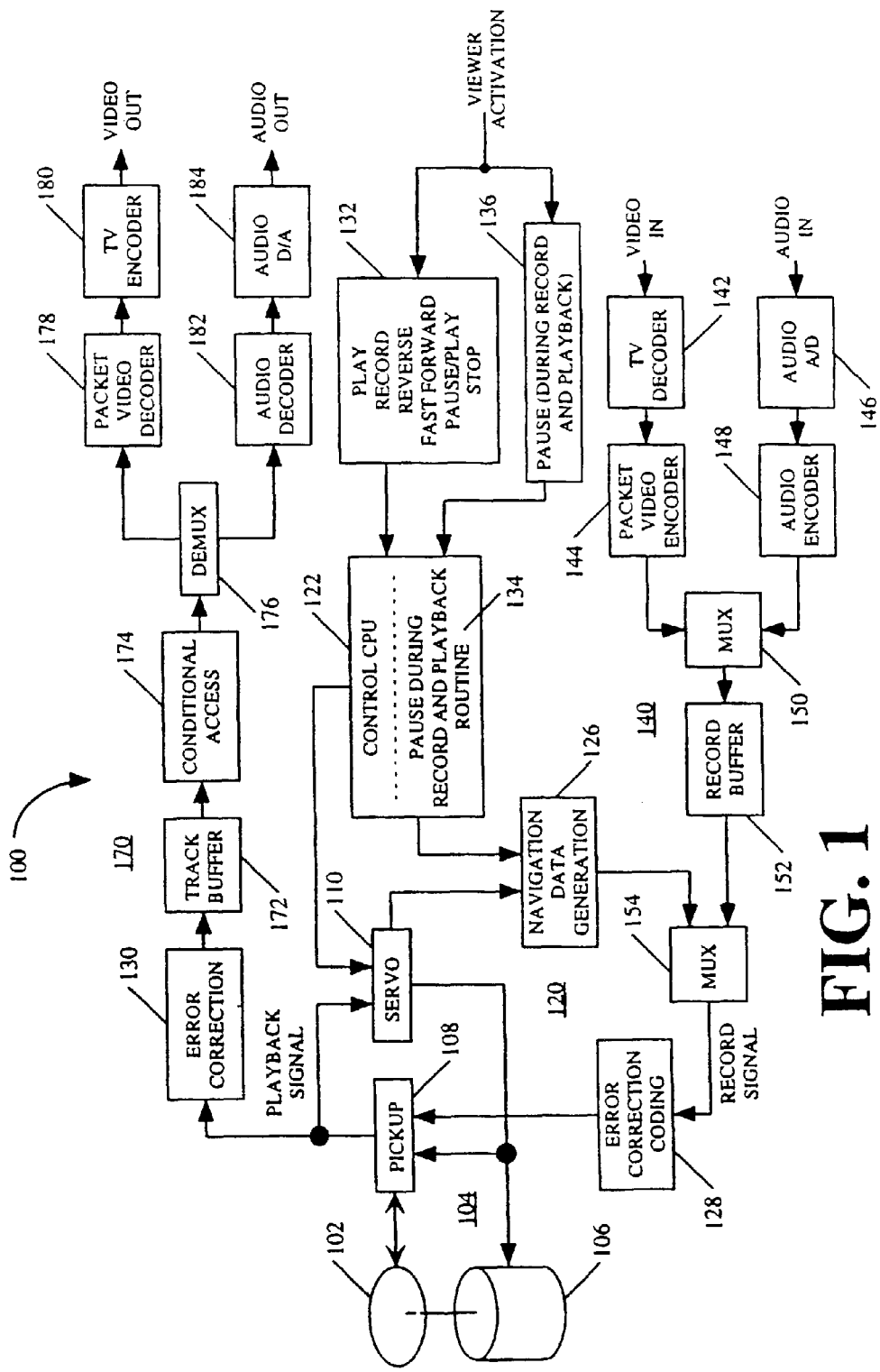
FIG. 1 is a block diagram of a re-writable DVD device that can be provided with one or more advance operating features in accordance with the inventive arrangements.

A device 100 for implementing a method of disaster recovery for re-writable disk media in accordance with the inventive arrangements taught herein utilizes a recordable, re-writable disk medium 102 in accordance with the inventive arrangements is shown in block diagram form in FIG. 1. The re-writable disk medium 102 is embodied as a re-writable DVD in the illustrated embodiment. In many instances, as will be noted, the re-writable disk medium can also be, for example, a hard drive or a magneto optical disk (MOD). An example of a MOD is a minidisk. In many instances, the inventive arrangements are applicable to video or audio or both video and audio.

The device 100 is capable of writing onto and reading from recordable DVD media, in this example, a re-writable DVD 102. The device comprises a mechanical assembly 104, a control section 120, a video/audio input processing path 140 and a video/audio output processing path 190. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the disk 102 and a pickup assembly 108 that is adapted to be moved over the spinning disk. The pickup 108 and the motor 106 are controlled by a servo 110. The servo 110 can receive a playback signal of data which can be read from a spiral track of the disk 102 as a first input. The playback signal also can be an input to an error correction circuit 130, which can be considered part of the control section or part of the video/audio output processing path.

When reading data from the disk 102, a laser on the pickup assembly 108 can direct laser light at an interior layer surface of the disk 102. Depending upon the data stored on the disk 102, the laser light can be mostly reflected or mostly absorbed. The pickup assembly 108 can interpret reflected light as one type of electrical signal while light absorbed by the interior layer surface of the disk 102 can be interpreted as a second type of electrical signal. In the preferred embodiment, transitions between reflectivity and non-reflectivity are mapped to a digital signal referred to as the playback signal which corresponds to the data stored on the disk 102.

By comparison, during recording, a laser on the pickup assembly burns spots onto a spiral track on the disk 102 in order to digitally record video and/or audio program material. More particularly, the disk 102, which can include at least one interior crystalline recording layer, can exhibit two distinctive states, amorphous or crystalline, each having different reflectivity characteristics. Those different levels of reflectivity can be detected by optical sensors in the pickup assembly 108.

Prior to recording, the interior recording layer of the disk is in a crystalline state exhibiting high reflectivity. The light intensity of a laser beam can be modulated to write amorphous data marks on the surface of tracks in the interior crystalline recording layer. Specifically, the energy of a laser pulse can quickly raise the surface temperature of the interior crystalline recording layer above the layer melting point. Once above the melting point, the interior layer can transition from a crystalline state of high reflectivity to an amorphous state of low reflectivity. Subsequently, the rapid cooling of the layer prevents the molecular structure of the interior layer from reorganizing into a crystalline state. Hence, digital data can be mapped to a series of laser pulses which can write a digital code to the disk 102 which can correspond to the digital data.

Notably, depending upon capacity requirements, the disk 102 can have either one or two recordable sides. Additionally, the disk 102 can have multiple recordable layers per side. However, for purposes of understanding the invention, the number of sides and layers is irrelevant. Moreover, in the event of a double-sided recording, it also is irrelevant whether the recording of both sides of the disk 102 occurs from one or both sides of the disk 102.

Returning now to FIG. 1, the control section 120 preferably comprises a controller 122 and a navigation data generation circuit 126. The controller 122 supplies a first input signal to the navigation data generation circuit 126 and the servo 110 supplies a second input signal to the navigation data generation circuit 126. The servo can also be considered part of the control section 120. The navigation data generation circuit 126 supplies a first input signal to the multiplexer (MUX) 154, which forms part of the video/audio input processing path 140. The output of the MUX 154 is an input to an error correction coding circuit 128. The output of the error correction coding circuit 128 is a recordable input signal supplied to the pickup 108, which will be "burned" onto the spiral track of the disk 102 by the laser.

The controller 122 also preferably has access to the data contained in the track buffer 172 and record buffer 152 as shown in FIG. 1. The controller 122 can delete, modify, and reformat video data stored in the track buffer 172 and record buffer 152 for the purpose of implementing the inventive arrangements. Control and data interfaces are also preferably provided for permitting the controller 122 to control the operation of packet video encoder 144 and audio encoder 148 for implementing the inventive embodiments as described herein. Suitable software or firmware is provided in memory for the conventional operations performed by controller 122. In addition, program routines for the advanced features 134 are provided for controlling the controller 122 in accordance with the invention as shall hereinafter be described in greater detail.

A control buffer 132 for viewer activatable functions indicates those functions presently available, namely play, record, reverse, fast forward, pause/play and stop. The pause is a counterpart to pause operation in a VCR, for example manually interrupting the play back of a prerecorded program or interrupting the recording of a viewed program to eliminate commercials from the recording. A separate pause buffer 136 is provided to receive commands for performing the pause during record and playback function.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As each packet is constructed, each packet is combined with the output of the navigation data generation circuit in the MUX 154 and sent to the error correction coding circuit 128. Error correction coding circuit 128 can also be deemed to be part of the input path 140.

The output processing path 170 comprises a track buffer, or output buffer, 172, in which data read from the disk is assembled into packets for further processing. The packets are processed by conditional access circuit 174 that controls propagation of the packets through demultiplexer 176 and into respective paths for video and audio processing. The video is decoded by decoder 178, for example from MPEG-1 or MPEG-2, and encoded as a conventional television signal, for example NTSC or PAL. The audio is decoded by circuit 182, for example from MPEG-1 or MPEG-2, and converted to analog form by audio digital-to-analog (D/A) converter 184. The output processing path 170 can be deemed to include the error correction circuit 130, as noted.

Device 100 can represent a machine having, for example, a 1× read and 1× write capability. Such devices can typically have maximum data rates for recording or playing back of approximately 11 megabits/second. In order to implement some of the inventive arrangements is necessary to play back (read) and record (write) in a manner that appears to be simultaneous. Apparently simultaneous playing back and recording with such a machine would seem to be impossible, but even such a minimal capability machine can be advantageously operated in accordance with the inventive arrangements to provide apparently simultaneous playing back and recording as well as other inventive arrangements. It will also be appreciated that the inventive arrangements can also be useful for devices having higher data rates.

DVD Media

Figure 2:
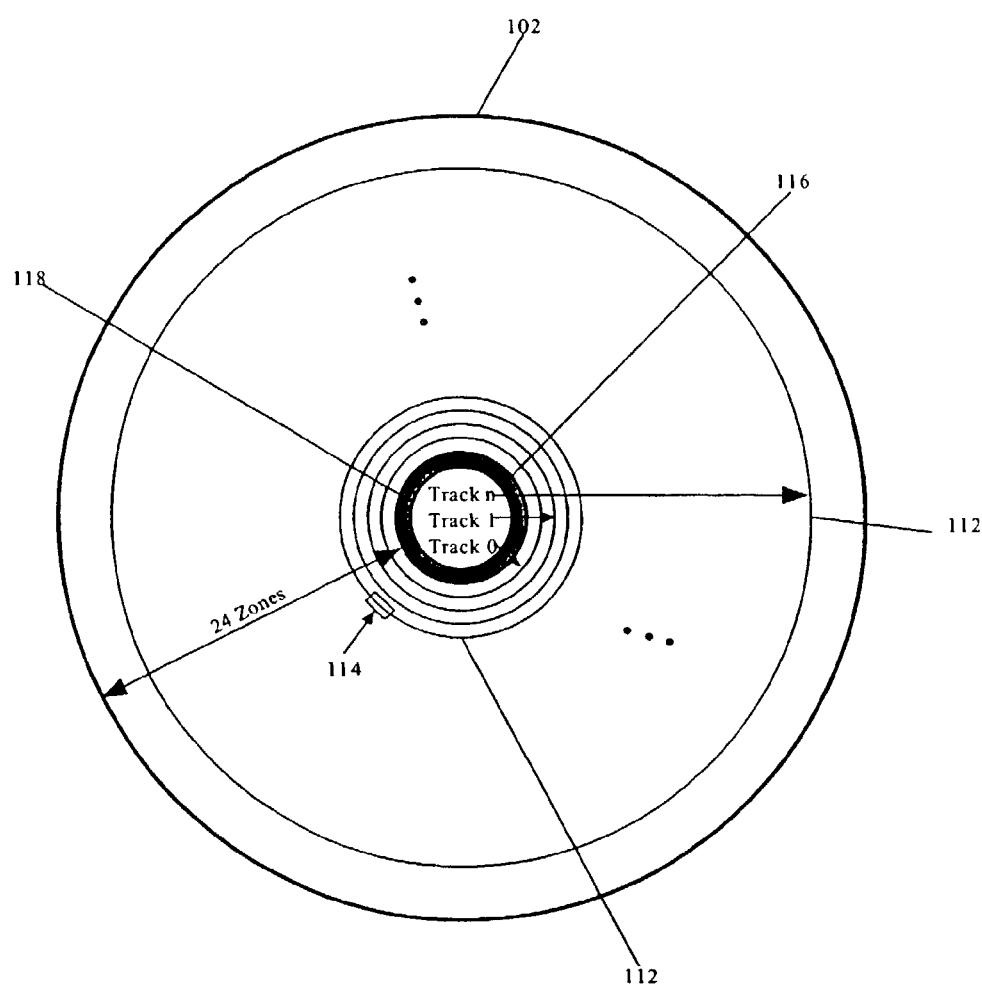
FIG. 2 is a schematic diagram of recordable DVD media.

For purposes of illustrating the inventive arrangements, program material can be recorded onto recordable DVD media, for example the re-writable DVD of FIG. 1, and played back from the re-writable DVD. The re-writable DVD 102, as shown in further detail in FIG. 2, can consist of two substrates bonded together by an adhesive layer forming a 1.2 mm thick disk. A center hole 118 can be formed in the center of the disk so that a gripping device of the motor 106 of FIG. 1 can securely grip the disk and control the angular motion of the same in accordance with the inventive arrangements.

As in convention DVD-RAM technology, the re-writable DVD 102 of the present invention incorporates a land/groove structure and phase change material to record data to disk. The land/groove combination forms a continuous spiral 112, with data recorded alternately on land and groove. Data can be written onto the re-writable DVD 102 in an outwardly direction along the spiral 112, beginning with the smaller radius portion of the spiral to the larger radius portion of the spiral 112. The several series of three large dots (_ _ _) denote portions of the spiral not shown in the drawing. Each nearly circular, radially concentric section of the spiral 112 is sometimes referred to as a track. Notably, the spiral 112 can be formed with a side-to-side wobble, not shown in the drawing, to accommodate media type indexing. Due to difficulties of scale only portions of the spiral 16 are shown, and these are shown in greatly enlarged scale.

To maintain constant data density across the surface of the re-writable DVD 102, the recording surface is divided into twenty-four (24) annular zones. Each zone has 1,888 tracks, including 944 land tracks and 944 grove tracks. Each track is divided into sectors 114 (only a single sector is shown for simplicity). The innermost zone has seventeen (17) sectors per track. The number of sectors per track increases by one in each succeeding zone. Hence, the outermost zone contains forty (40) sectors per track. Each sector 114 begins with a read-only identification field, embossed onto the disk surface. This identification field, known as the header, is used to identify the physical location of the sector and is kept separate from the user recordable data field, to assure that it is permanently readable. The re-writable DVD 102 can further include an embossed area 116 containing read-only data which can identify the type of media, for example DVD-RAM, DVD-ROM, or DVD-R.

It will be appreciated that the advanced features taught herein are applicable to other kinds of disk media and disk media players and recorders. Additionally, various modifications of the device illustrated in FIG. 1 and the disk medium illustrated in FIG. 2 can be used together to implement the advanced features taught herein in accordance with the inventive arrangements. In particular, a solution for defective sector management in accordance with the inventive arrangements can include modifications of and additions to hardware, firmware and software in the controller 122 for recording data to recordable DVD media.

Efficient Disaster Recovery for Digital Disk Recorder

A new approach in accordance with the inventive arrangements is taught herein to effectively handle disaster recovery for digital disk recorders, for example DVD-RW, DVD-RAM, DVD+RW, Streamer, and the like. Notably, the present invention can be realized in hardware, software, or a combination of hardware and software. Machine readable storage according to the present invention can be realized in a centralized fashion in one computer system, for example the controller 122, or in a distributed fashion where different elements are spread across several interconnected computer systems. Any kind of computer system or other apparatus adapted for carrying out the methods described herein is acceptable.

Specifically, although the present invention as described herein contemplates the controller 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the controller 122 described above.

In the method of the invention, despite a data disaster, for example a power outage, data recording can resume without risking overwriting previously recorded, valid data. Additionally, all of the control information associated with recorded data can be recovered by advantageously re-scanning the data that had been recorded to the disk media and computing the control information. Notably, in furtherance of the objects of the present invention, the present invention introduces the record unit (RU) as a mechanism for avoiding the overwriting of valid data and for reducing the recovery time following a media disaster.

Figure 3:
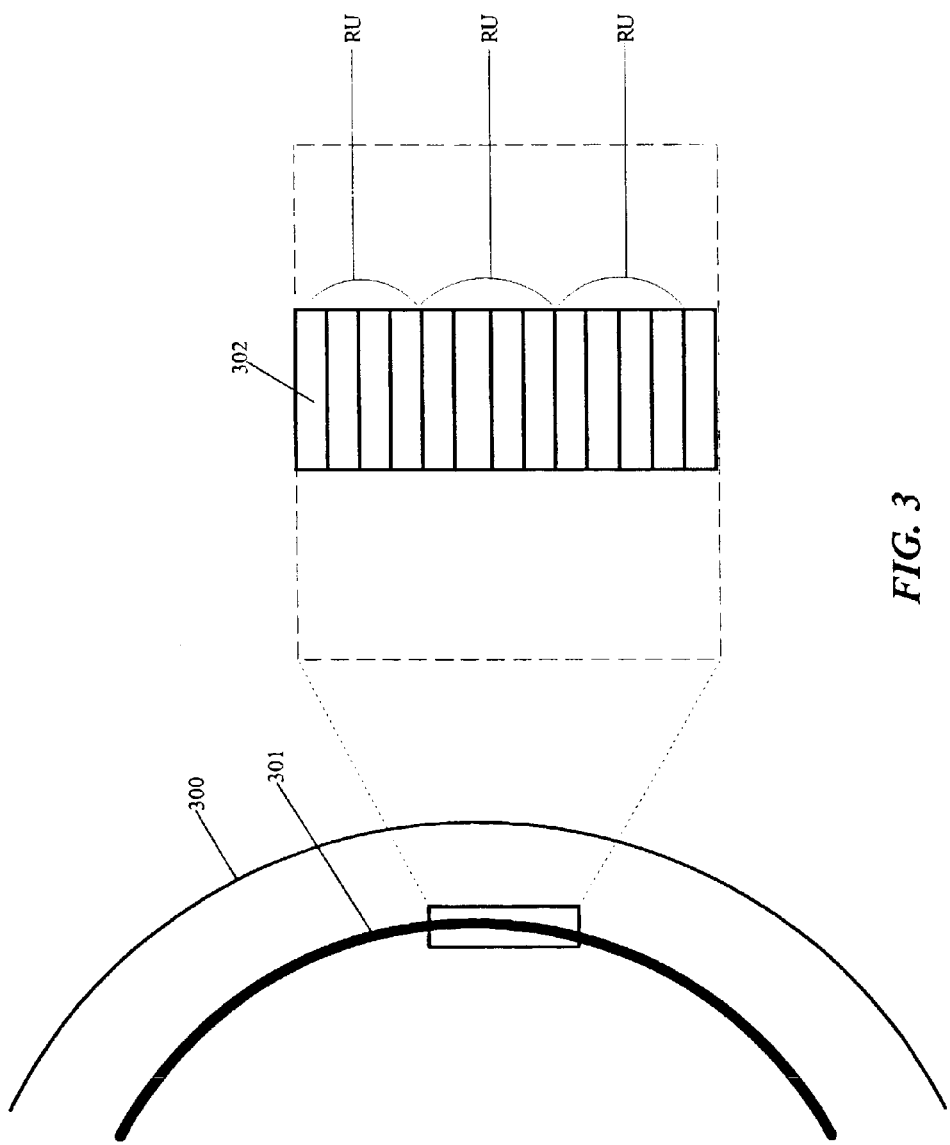
FIG. 3 is a schematic diagram illustrating the relationship between a recordable unit and the sectors in recordable DVD media.

Significantly, unintentionally overwriting valid data which had been recorded prior to the data disaster with valid data recorded subsequent to the data disaster can be prevented in accordance with the inventive arrangements. In particular, the present invention can utilize a sequence of RUs to implement a disaster recovery method. As shown in FIG. 3, an RU is a logical representation of a block of sectors 302 in re-writable disk media 300 in which data can be physically recorded during a recording operation. Specifically, a track 301 in the re-writable disk media 300 can include a plurality of sectors 302 in which data can be recorded. In the preferred embodiment, a sequence of RUs encompassing sectors across multiple tracks can be defined in the re-writable disk media. As a result, at least a portion of the re-writable disk can be logically, but not physically, partitioned into the sequence of RUs.

Notably, the sequence of RUs need not represent all sectors in the re-writable disk media. Rather, the sequence of RUs can represent merely a subset of all sectors in the re-writable disk media, for example only those sectors storing data comprising a single application or program. In addition, the sectors of each RU in the sequence can be physically adjacent to the sectors of adjoining RUs so that the sectors represented by the entire sequence of RUs forms a physically contiguous block of storage in the re-writable disk media. Still, the invention is not limited in regard to the logical implementation of the sequence of RUs. In fact, in an alternative embodiment, the sectors of each RU in the sequence can be physically apart from the sectors of an adjacent RU. In such a case, each RU merely can include a pointer to the next logically adjacent RU in the sequence of RUs.

Figure 9:
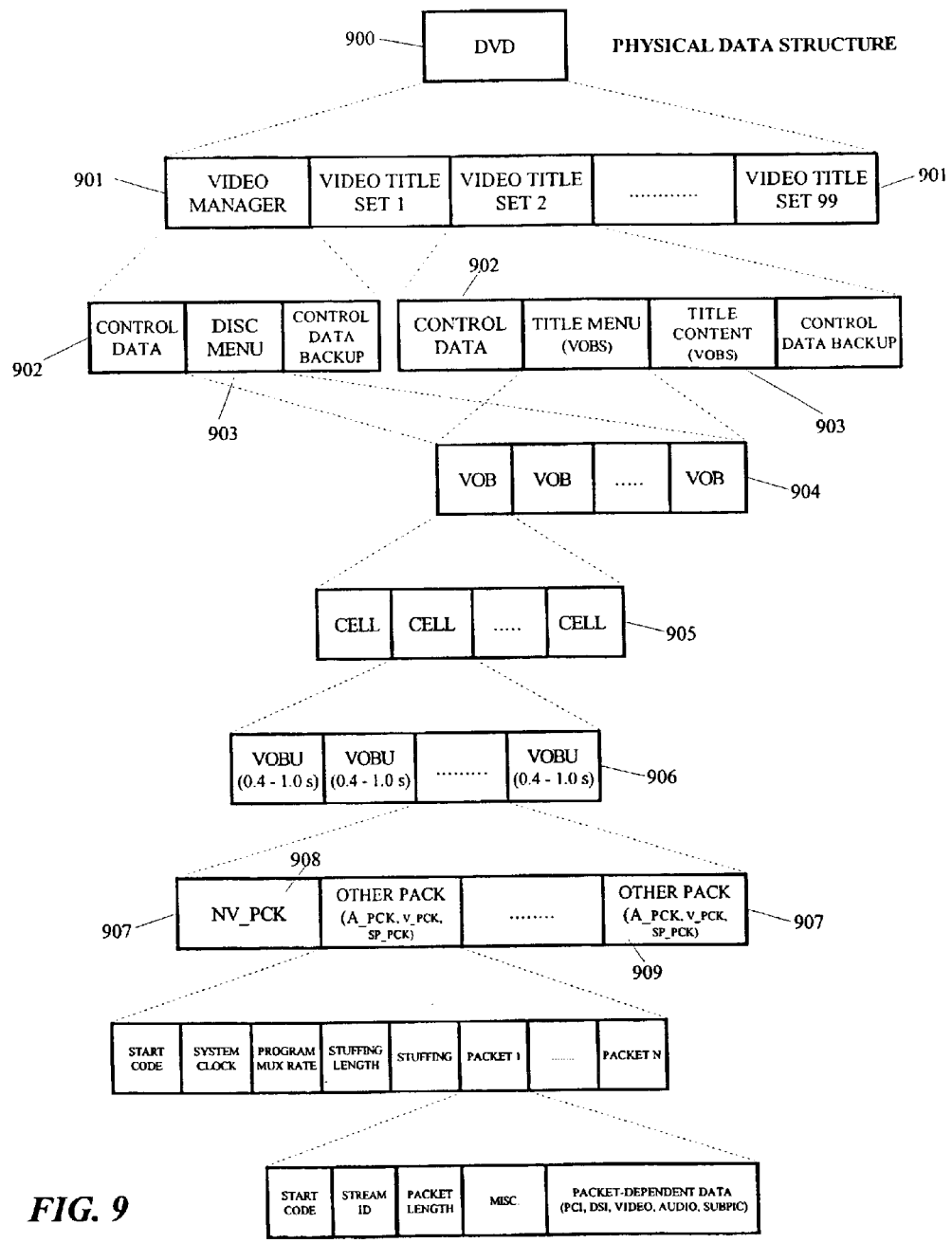
FIG. 9 is a block diagram illustrating a DVD file hierarchy.

Sectors represented by an RU can store therein audiovisual data, for example video, audio, and sub-picture data, in accordance with the physical data structure of the re-writable disk media as shown in FIG. 9. The size of an RU can be dependent on the application. To avoid wasted space, the size of an RU preferably can be variable, but is limited by a previously defined maximum size, for example 50 Megabytes (MB), 100 MB, 500 MB, etc. However, in an alternative embodiment, an RU can have a fixed size. Still, regardless of the fixed or variable nature of the size of the RU, if the size of a data segment to be recorded exceeds the maximum size of an RU, the data segment can be recorded into multiple RU's, with the last RU (RU #i+3) potentially being smaller than the other RUs, as shown in FIG. 4.

In association with the definition of the sequence of RUs, an RU metrics file shown in FIG. 5 as RU.IFO, can be added in the root directory of the re-writable disk media as shown in FIG. 6. The RU.IFO file can contain a table of RU metrics corresponding to RUs which have had data completely recorded therein. In particular, the table in the RU.IFO file can contain a record for each defined RU. Each record can include data fields which can contain metrics for the corresponding RU whose sectors have been filled with recorded data. An exemplary table of RU metrics in the RU.IFO file is shown in FIG. 5. Preferably, the RU metrics can include start address which is the sector number of the start address of the corresponding RU; size which is the number of sectors of the corresponding RU; infostadd which is the start address of an associated RU control information block; infosz which is the number of sectors of the associated RU control information block; and, date_and_time which is the date and time when the corresponding RU had been created.

Additionally, as shown in FIG. 7, each RU can have associated therewith a separately stored RU control information block containing the control information for the associated RU. Notably, the control information can include VOBU addresses for each VOBUs stored in sectors in the corresponding RU, a current address in the RU in which data can be recorded, and a recording start address. Each RU control information block need not be stored sequentially. Moreover, each RU control information block can have arbitrary length. Finally, each RU control information block can be deleted when no longer needed.

Figure 8A:
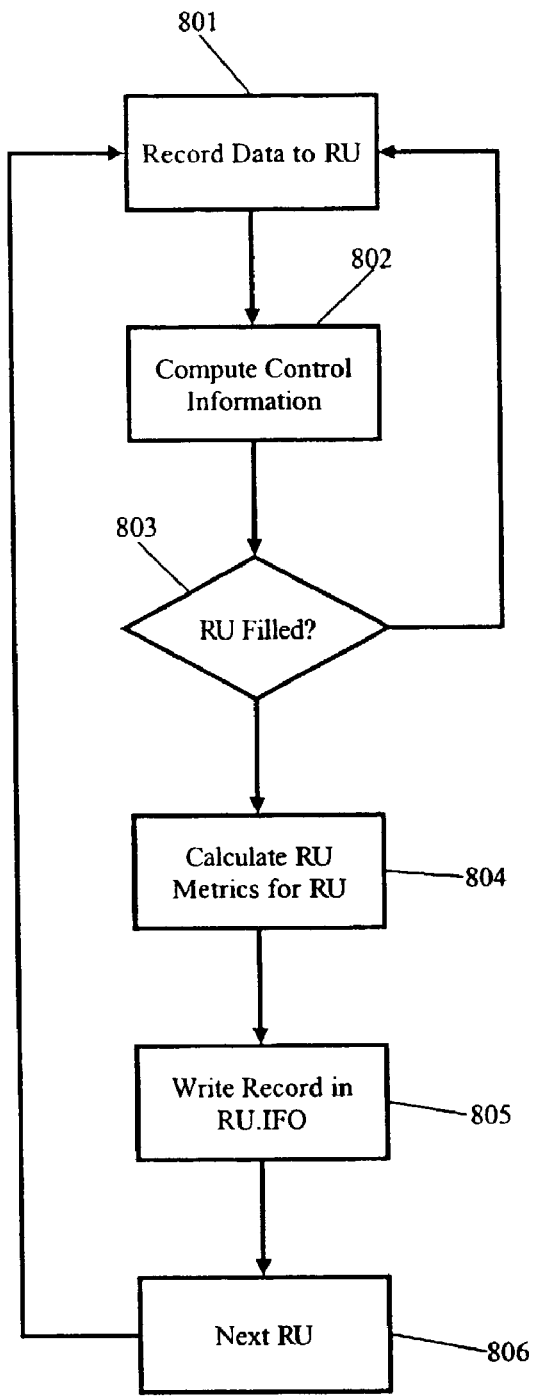
FIGS. 8A-8B, taken together, is a flow chart illustrating the efficient disaster recovery method of the present invention.

FIG. 8A illustrates a process for recording data to re-writable disk media in accordance with the inventive arrangements. In step 801, data can be recorded to sectors in an RU. In step 802, control information can be computed and temporarily stored in memory subsequent to recording each sector. In decision step 803, it is determined whether each sector in the RU has been used to record data such that further data must be recorded into sectors in a next logically adjacent RU in the sequence of RUs. If not, additional data can be recorded to the remaining sectors in the RU.

If, however, the RU has been completely filled, the control information which had previously been computed and temporarily stored in memory can be written to an associated RU control information block. Additionally, in step 804, RU metrics for the RU can be calculated. In step 805, the calculated RU metrics can be written to a record in the RU.IFO file. Finally, in step 806, the process can repeat for sectors in a next RU in the sequence of RUs.

Figure 8B:
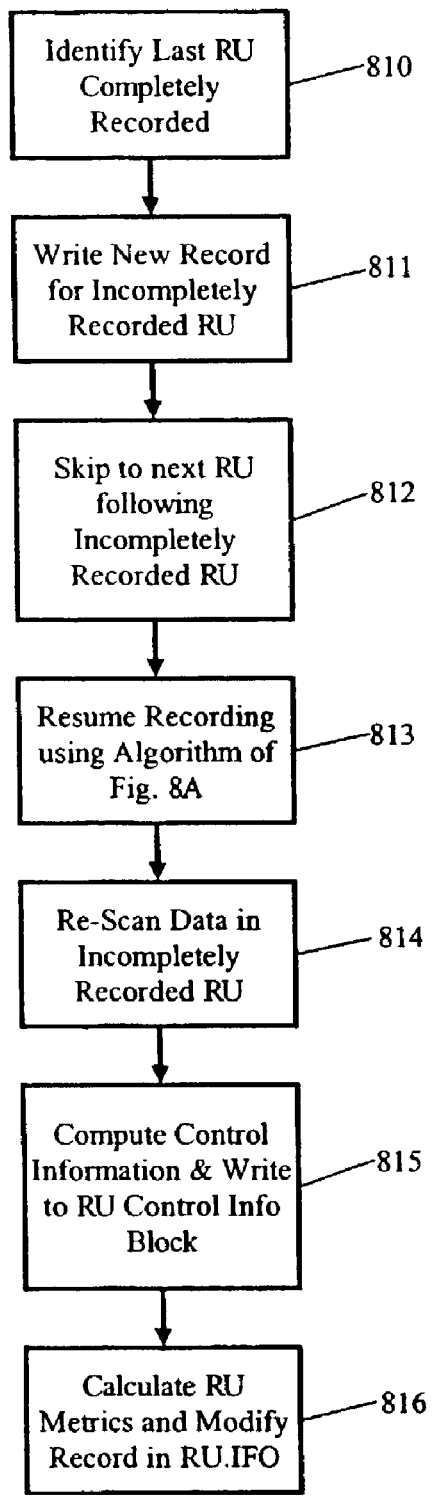

FIG. 8B illustrates a disaster recovery process in accordance with the inventive arrangements. If, during the recording of data into an RU, a data disaster occurs, the control information accumulated temporarily in memory will not have been stored in an RU control information block and will be lost. Additionally, RU metrics for the RU will never have been computed and will not have been written to the RU.IFO file. Hence, the process illustrated in FIG. 8B can provide a disaster recovery method which can permit recording to resume with a minimum of latency and can recover the lost control information and RU metrics for the RU in which data had been recorded during the disaster event.

Specifically, to recover from the occurrence of a disaster when recording into sectors in an RU, first, in step 810, the most recent RU in which data had been completely recorded can be identified by reference to the RU.IFO file. Specifically, the last complete record can correspond to the most recent RU in which data had been completely recorded. Subsequently, in step 811, a new record having temporarily incomplete data fields can be written to the RU.IFO file for the RU logically adjacent to the most recent RU in which data had been completely recorded. Notably, it can be assumed that the RU logically adjacent to the most recent RU in which data had been completely recorded is the RU in which data had been incompletely recorded at the time of the disaster.

Thus, in steps 812 and 813, recording can resume in an RU logically succeeding the RU in which data had been incompletely recorded. In particular, the recording of data into sectors in succeeding RUs can continue in accordance with the algorithm illustrated in FIG. 8A. Upon the completion of the recording, both RU metrics and RU control information can be computed for the RU in which data had been incompletely recorded leading up to the disaster. Specifically, in step 814, the RU in which data had been incompletely recorded during the disaster can be re-scanned. The re-scanning can occur in a variety of ways including, but not limited to a simple playback, fast forwarding, etc. During the re-scanning, in step 815, control information can be computed for the data in the RU. When the re-scanning of the RU has been completed, the control information can be written to a corresponding RU control information block. Additionally, in step 816, RU metrics for the RU can be calculated and written to data fields in the incomplete record in the RU.IFO file.

The following example is presented for purposes of illustrating the above-described process of FIGS. 8A and 8B. In the case where RUs are defined for a portion of a re-writable disk, each RU having a fixed size of 10 MB, data can initially be recorded into sectors of the first RU. As in convention recording operations, during the recording process, control data can be computed for the recorded data and temporarily stored in memory. The recording can continue until the first 10 MB of data are completely recorded into sectors in the first RU so that the first RU can store no more data in accordance with the predefined maximum size. When the sectors in the first RU have been completely filled, the temporarily stored control information can be stored in a first RU control information block corresponding to the first RU. Additionally, RU metrics for the first RU can be calculated and written to a record in the RU.IFO file. Subsequently, the recording process can continue in sectors associated with a second RU.

If, during the recording of data into the second RU, a data disaster occurs, the control information for the second RU which had been accumulated temporarily in memory will not have been stored in an RU control information block and will be lost. Additionally, RU metrics for the second RU will never have been calculated and will not have been written to the RU.IFO file. Thus, to recover from the data disaster with a minimum of latency, first it must be determined where in the re-writable disk media recording can resume without overwriting existing data.

In accordance with the inventive arrangements, the RU.IFO can be referenced for the last RU in which data had been completely recorded. In this example, it will be apparent that the first RU is the last RU in which data had been completely recorded. In consequence, it can be assumed correctly that the second RU is the RU in which data had been incompletely recorded at the time of the data disaster. Because it is unclear at which sector in the second RU recording can safely resume, the recording can resume in the sectors of the third RU.

When the recording into the four RUs has completed, the sectors of the second RU can be re-scanned in order to reconstruct the control information for the second RU. Specifically, the data in the second RU can be played back at high speed during which time the control information can be computed. Upon completion, the control information for the second RU can be written to a corresponding second RU control information block. Additionally, RU metrics for the second RU can be calculated and written to appropriate data fields in the RU.IFO file.

Hence, in consequence of the definition of the sequence of RUs and the computation of RU metrics in association therewith, data recording can resume subsequent to a data disaster, such as a power outage, without risking overwriting previously recorded, valid data. Additionally, all of the control information associated with recorded data can be recovered by advantageously re-scanning the data that had been recorded to the disk media and computing the control information. Thus, the present invention provides for a method for media disaster recovery when recording data to re-writable disk media.

The invention claimed is:

1. A method for media disaster recovery when recording data to re-writable disk media comprising the steps of:
  defining a sequence of recordable units (RUs) in the re-writable disk media, each RU in said sequence having a maximum data capacity;
  sequentially recording data in each RU in said sequence;
  computing RU metrics for each RU in which data has been completely recorded and storing said computed metrics in an RU information file in the rewritable disk media;
  responsive to a media disaster, identifying with said RU information file a disaster RU in which data had been incompletely recorded during said media disaster by ascertaining by said metrics in said RU information file an RU in which data had been most recently completely recorded and determining said disaster RU to be an RU next in sequence to said ascertained RU; and,
  resuming said sequential recording of data in an RU next in sequence to said disaster RU.

2. The method of claim 1, further comprising the step of determining control information for data stored in each RU in said sequence and storing said computed control information in RU control information blocks, said RU control information blocks stored in the re-writable disk media separately from corresponding RUs.

3. The method of claim 2, further comprising the steps of:
  re-scanning data stored in said disaster RU;
  computing control information for said re-scanned data; and,
  storing said computed control information for said re-scanned data in an RU control information block corresponding to said disaster RU.

4. The method of claim 2, wherein said control information comprises video object unit addresses, a current address, and a recording start address.

5. The method of claim 2, wherein said RU metrics for each RU comprises a start address for said RU, an indication of size for said RU, a start address for a corresponding RU control Information block, an indication of size of said corresponding control information block, and a date/time stamp indicating when data had been completely recorded in said RU.

6. The method of claim 1, wherein each said RU has a fixed size, said fixed size not exceeding said maximum data capacity.

7. The method of claim 1, wherein each said RU has a variable size, said variable size not exceeding said maximum data capacity.

8. The method of claim 1, wherein said RU metrics for each RU comprises a start address for said RU, an indication of size for said RU, and a date/time stamp indicating when data had been completely recorded in said RU.

9. The method of claim 8, wherein said RU metrics for each RU further comprises a start address for a logically adjacent RU next in sequence to said RU.

10. The method of claim 1, wherein said RUs are physically adjacent to one another.

11. A computer apparatus programmed with a set of instructions stored in a fixed medium, said computer apparatus comprising:

means for defining a sequence of recordable units (RUs) in re-writable disk media, each RU in said sequence having a maximum data capacity;

means for sequentially recording data in each RU in said sequence;

means for computing RU metrics for each RU in which data has been completely recorded and storing said computed metrics in an RU information file in said re-writable disk media;

means responsive to a media disaster for identifying with said RU information file a disaster RU in which data had been incompletely recorded during said media disaster, said means responsive to a media disaster including means for ascertaining by said metrics in said RU information file an RU in which data had been most recently completely recorded and means for determining said disaster RU to be an RU next in sequence to said ascertained RU; and, means for resuming said sequential recording of data in an RU next in sequence to said disaster RU.

12. The computer apparatus of claim 11, further comprising means for determining control information for data stored in each RU in said sequence and storing said computed control Information in RU control information blocks, said RU control information blocks stored in the re-writable disk media separately from corresponding RUs.

13. The computer apparatus of claim 12, further comprising:

means for re-scanning data stored in said disaster RU;

means for computing control information for said re-scanned data; and, means for storing said computed control information for said re-scanned data in an RU control information block corresponding to said disaster RU.

14. The computer apparatus of claim 12, wherein said control information comprises video object unit addresses, a current address, and a recording start address.

15. The computer apparatus of claim 12, wherein said RU metrics for each RU comprises a start address for said RU, an indication of size for said RU, a start address for a corresponding RU control information block, an indication of size of said corresponding control information block, and a date/time stamp indicating, when data had been completely recorded in said RU.

16. The computer apparatus of claim 11, wherein each said RU has a fixed size, said fixed size not exceeding said maximum data capacity.

17. The computer apparatus of claim 11, wherein each said RU has a variable size, said variable size not exceeding said maximum data capacity.

18. The computer apparatus of claim 11, wherein said RU metrics for each RU comprises a start address for said RU, an indication of size for said RU, and a date/time stamp indicating when data had been completely recorded in said RU.

19. The computer apparatus of claim 18, wherein said RU metrics for each RU further comprises a start address for a logically adjacent RU next in sequence to said RU.

20. The computer apparatus of claim 11, wherein said RUs are physically adjacent to one another.

21. A non-transitory computer-readable medium, having stored thereon a computer program for media disaster recovery when recording data to re-writable disk media, said computer program having a plurality of code sections executable by a machine for causing the machine to perform the steps of:

defining a sequence of recordable units (RUs) in the re-writable disk media, each RU in said sequence having a maximum data capacity;

sequentially recording data in each RU in said sequence;

computing RU metrics for each RU in which data has been completely recorded and storing said computed metrics in an RU information file in the rewritable disk media;

responsive to a media disaster, identifying with said RU information file a disaster RU in which data had been incompletely recorded during said media disaster by ascertaining by said metrics in said RU information file an RU in which data had been most recently completely recorded and determining said disaster RU to be an RU next in sequence to said ascertained RU; and, resuming said sequential recording of data in an RU next in sequence to said disaster RU.

22. The non-transitory computer-readable medium of claim 21, for further causing the machine to perform the step of determining control information for data stored in each RU in said sequence and storing said computed control information in RU control information blocks, said RU control, information blocks stored in the re-writable disk media separately from corresponding RUs.

23. The non-transitory computer-readable medium of claim 22, for further causing the machine to perform the steps of:

re-scanning data stored in said disaster RU;

computing control information for said re-scanned data; and, storing said computed control information for said re-scanned data in an RU control information block corresponding to said disaster RU.

24. The non-transitory computer-readable medium of claim 22, wherein said control information comprises video object unit addresses, a current address, and a recording start address.

25. The non-transitory computer-readable medium of claim 22, wherein said RU metrics for each RU comprises a start address for said RU, an indication of size for said RU, a start address for a corresponding RU control information block, an indication of size of said corresponding control information block, and a date/time stamp indicating when data had been completely recorded in said RU.

26. The non-transitory computer-readable medium of claim 21, wherein each said RU has a fixed size, said fixed size not exceeding said maximum data capacity.

27. The non-transitory computer-readable medium of claim 21; wherein each said RU has a variable size, said variable size not exceeding said maximum data capacity.

28. The non-transitory computer-readable medium of claim 21, wherein said RU metrics for each RU comprises a start address for said RU, an indication of size for said RU, and a date/time stamp indicating when data had been completely recorded in said RU.

29. The non-transitory computer-readable medium of claim 28, wherein said RU metrics for each RU further comprises a start address for a logically adjacent RU next in sequence to said RU.

30. The non-transitory computer-readable medium of claim 21, wherein said RUs are physically adjacent to one another.

* * * * *